United States Patent

[11] 3,626,296

[72] Inventor Albertus C. van der Veen
Gillingham, England
[21] Appl. No. 860,378
[22] Filed Sept. 23, 1969
[45] Patented Dec. 7, 1971
[73] Assignee Multitone Electric Company Limited
London, England
[32] Priority Sept. 30, 1968
[33] Great Britain
[31] 46,357/68

[54] RADIO PAGING RECEIVERS
2 Claims, 2 Drawing Figs.

[52] U.S. Cl. .......... 325/55, 325/364, 325/473, 340/311
[51] Int. Cl. .......... H04b 1/16, H04m 11/02
[50] Field of Search .......... 325/55, 6, 64, 364, 473; 340/224, 286, 311; 331/64; 179/84 SS, 84 T, 82

[56] References Cited

UNITED STATES PATENTS

| | | | |
|---|---|---|---|
| 3,124,658 | 3/1964 | Sneath | 179/84 |
| 2,845,621 | 7/1958 | Hasbrook | 325/6 X |
| 3,283,315 | 11/1966 | Frear | 325/364 X |
| 3,513,397 | 5/1970 | Shimada | 325/55 X |

*Primary Examiner*—Robert L. Richardson
*Attorney*—Mason, Fenwick & Lawrence

ABSTRACT: A radio receiver for a staff location system emits an audible alerting signal in response to, but subsequent to a calling signal, thereby avoiding interaction between the input and output circuits. The duration of the alerting signal is determined by the period of a monostable circuit.

INVENTOR
ALBERTUS C. VAN DER VEEN
BY
Mason, Fenwick & Lawrence
ATTORNEYS

RADIO PAGING RECEIVERS

BACKGROUND OF THE INVENTION

Known staff location systems use pocket radio receivers which are carried by the people to be located, the receivers being operated by open radiation from one or more central radio transmitters and aerials, or by induction from loops disposed about the buildings or areas where the staff are situated. It is usual in such systems for the receivers to be selective, that is to say, for each receiver to be sensitive only to one predetermined calling signal, for example a signal of a predetermined frequency. The calling signal may or may not be followed by speech. Where speech is transmitted it is usual for the output level of the speech to be considerably lower than that of the calling signal, the usual practice being to take the receiver out of the pocket and hold it near the ear, pressing a button to put the receiver into speech condition.

A received calling signal may produce an audible or otherwise recognizable alerting signal in the receiver by one of two methods:

a. By a local oscillator which is actuated by a transmitted pulse and continues to oscillate only for the duration of the pulse.

b. By a local oscillator triggered into operation by a transmitted pulse, but continuing to oscillate when the transmitted pulse has ceased.

If method (b) is used, the receiver is known as a triggered receiver, such receivers having the advantage of emitting the same alerting signal whether the receiver is in a strong or a weak field. However, such receivers have the disadvantage that an emergency call cannot be distinguished from a routine call, because the alerting signal cannot be coded as it can with method (a).

With receivers using method (a) it has been found that where a high-level alerting signal is required to overcome a high level of ambient noise, the overall sensitivity of the receiver is limited by interaction between the altering and receiving circuits.

Such interaction between the input and output, or alerting and receiving circuits is ordinarily caused by currents flowing in the output transducer wiring or output portions of the circuitry producing a field which induces voltages into the input circuitry of the receiver. Unlike a speech receiver where peak audio currents in the output system are merely transient, a paging receiver requires a sustained alternating current of high level in order to produce a high-intensity acoustic output.. If this high current is flowing during receipt of the remotely transmitted signal, a cross modulation or similar effect occurs between the remotely transmitted signal and the voltage induced from the output system. This produces an instability which causes the audible output to be broken up into a croaking sound instead of a clear tone.

SUMMARY OF THE INVENTION

One object of the present invention is to provide a radio receiver for use in a staff location system, in which interaction between the input and output circuits of the receiver is reduced by producing the alerting signal subsequent to the calling signal, as by delaying the production of the alerting signal such as an audible output tone until after termination of the input signal which activates the radio receiver.

Another object is to provide such a receiver which will respond to coded calling signals.

According to the present invention a radio receiver for use in a staff location system comprises a local oscillator which when oscillating causes an alerting signal to be produced, means to set the oscillator into oscillation subsequent to receipt of a predetermined calling signal, and means automatically to determine the duration of the alerting signal.

With such a receiver the alerting signal is not maintained by the continuation of the transmitted calling signal and is not present at the same time as the calling signal, so the lowering of the sensitivity of the receiver by interaction has no effect on it. Coding of the alerting signal is possible by varying the intervals between pulses forming the transmitted calling signals, so long as the intervals are greater than the chosen duration of the alerting signal. The duration of the alerting signal can conveniently be determined by the use of a monostable circuit.

BRIEF DESCRIPTION OF THE DRAWING

A radio receiver in accordance with the present invention will now be described by way of example with reference to the accompanying drawing, in which.

DESCRIPTION OF THE PREFERRED EMBODIMENT

The radio receiver to be described is a pocket receiver for use in a staff location system wherein a plurality of such receivers are provided, one being carried by each person to be located, and each receiver emitting an alerting signal on the receipt of a transmitted calling signal comprising a pulse of a frequency which is unique to that receiver.

Figure 1:
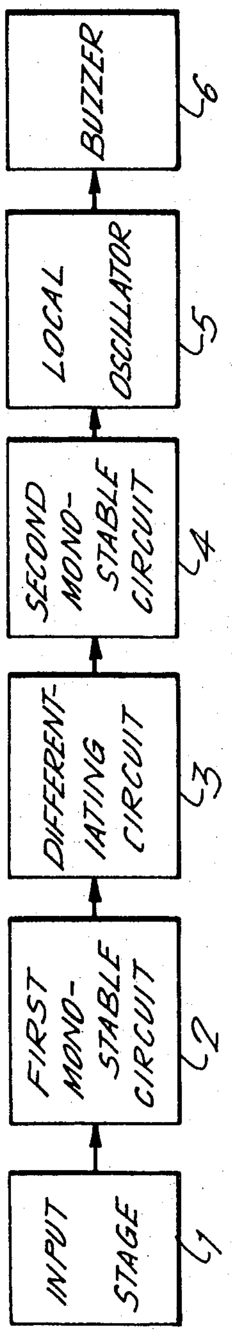
FIG. 1 shows the circuit of the receiver in block schematic form.

Referring to FIG. 1, the receiver comprises an input stage 1 which includes a tuned circuit arranged such that the stage 1 supplies an output signal only on receipt of a transmitted pulse of the frequency appropriate to the particular receiver.

The output of stage 1 is connected to a first monostable circuit 2, the output of which is connected by way of a differentiating circuit 3 to a second monostable circuit 4. The output of the monostable circuit 4 is connected to a local oscillator 5 which, when oscillating, energizes a transducer, such as a buzzer 6, which produces an audible alerting signal.

Figure 2:
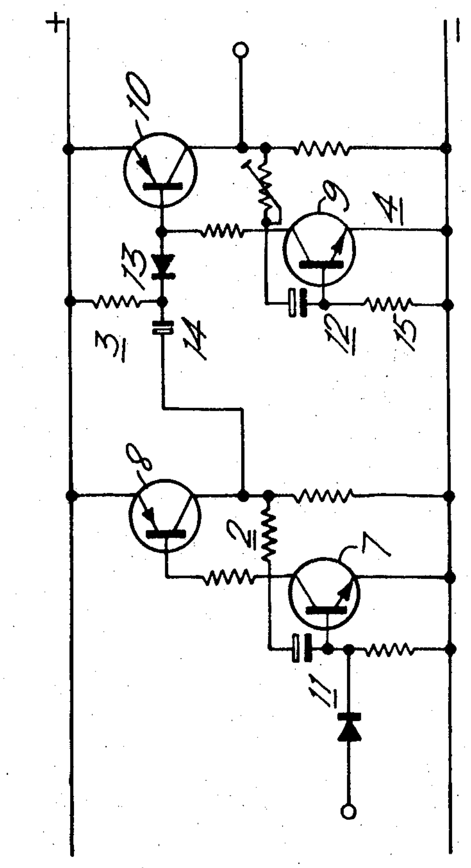
FIG. 2 shows a part of the circuit in detail.

Referring also to FIG. 2, the monostable circuits 2 and 4 are of generally similar form each comprising an n-p-n and a p-n-p junction transistor 7 and 8, 9 and 10 respectively interconnected as shown, and including timing networks 11 and 12 respectively. The differentiating circuit 3 comprises a resistor 13 and a capacitor 14.

The operation is as follows. When a signal is supplied by the input stage 1 to the monostable circuit 2, the monostable circuit 2 is triggered into its unstable conditions, in which it remains for a period determined by the timing network 11. This period is long compared with the period of the lowest frequency used for transmitted pulses, but short compared with the duration of a transmitted pulse. The monostable circuit 2 may therefore be triggered many times during a transmitted pulse, and its output signal approximates very closely to the square wave signal of positive polarity.

A short-duration negative-going pulse generated by the trailing edge of this output signal is applied to the monostable circuit 4 by the differentiating circuit 3. This causes the monostable circuit 4 to be triggered into its unstable condition for a period determined by the timing network 12. The output of the monostable circuit 4 is a square-wave signal of positive polarity and the oscillator 5 oscillates for the duration of this signal. The required duration of alerting signal is therefore automatically determined, primarily by the monostable circuit 4, independently of the level or duration of the transmitted pulse.

In a particular staff location system using such radio receivers the transmitted calling signals lie within the range 1 kHz. to 3.6 kHz., spaced frequencies within this range being allocated to respective receivers which have tuned circuits in their input stages 1 responsive to the respective frequencies.

A normal calling signal comprises a group of five or six transmitted pulses of the appropriate frequency, each pulse having a duration of 250 ms. and the intervals between the pulses being 450 ms. The period determined by the timing network 11 is of only a few milliseconds, so that the output of the monostable circuit 2 is a pulse of duration only slightly more than 250 ms. A few milliseconds after the end of each transmitted pulse, therefore, a pulse is supplied by the differentiating circuit 3 to the monostable circuit 4 which thereupon supplies a pulse of duration 125 ms. to the oscillator 5. The buzzer 6 therefore emits an audible alerting signal of duration 125 ms., and it is to be noted that the timing is such that the alerting signal has finished before the next transmitted pulse is received.

As an alternative, a code calling signal can be used comprising transmitted pulses of duration 250 ms. with an interval of say 2,000 ms. between pulses. Two or three such pulses can be transmitted in a predetermined coded manner to correspond to a predetermined message.

A further form of calling signal may be a group alert which may comprise a series of five transmitted pulses of duration 80 ms. separated by intervals of 160 ms. The shorter duration pulses and intervals enable such a signal to be transmitted more rapidly. However, as in the other cases, the timing is such that the alerting signal is not present at the same time as a transmitted pulse is being received.

Such radio receivers may be used where the calling signals are transmitted by open radiations from one or more central radio transmitters and aerials, or by induction from loops disposed about the buildings or areas where the staff are situated. In a modified form of the receiver for use in an induction system operating with calling signals in the frequency range between 15 kHz. and 150 kHz. or even lower, the receivers include an amplifier tuned to the carrier frequency used or to frequencies which differ for each receiver to produce selectivity. As before, the timing of the alerting signal and the calling signal is such that there is no interaction between the input and output stages of the receivers. This enables the receivers to be made more sensitive than would otherwise be the case and no weight penalty is incurred by the need to use shielding within the receivers. A further saving results from the reduced power of transmitters necessary, and the ability to operate with less extensive loops.

The invention may be applied to receivers which merely provide an alerting signal and also to receivers which include provision for receiving speech following an alerting signal. The invention may also be applied to receivers for use in systems where the calling signals comprise more than one frequency, the receivers being in such cases provided with input stages responsive for example to calling signals formed by a combination of two predetermined frequencies. Indeed the invention may be used in any such receiver to avoid difficulties resulting from interaction whether it results from the sensitivities used, the frequencies used or some other factor such as the miniaturization of the receiver.

Various modification can of course be made without departing from the invention as defined by the appended claims.

I claim:

1. A paging radio receiver for use in a staff location system for emitting an alerting signal responsive to a predetermined transmitted pulse calling signal having not greater than a selected calling pulse duration comprising: first pulse generator means selectively responsive to the predetermined calling signal and operable to produce a first pulse in response to the predetermined calling signal, the first pulse having a duration slightly greater than said selected calling pulse duration causing the trailing edge of said first pulse to occur after termination of the calling signal; means coupled to said first pulse generator means for producing a trigger pulse responsive to the trailing edge of said first pulse; second pulse generator means operative in response to said trigger pulse to produce a second pulse of selected duration after termination of said first pulse; a local oscillator connected to the second pulse generator means which is set into oscillation for the duration of said second pulse; and signal-producing means connected to the local oscillator to generate an altering signal for the duration of said second pulse.

2. A paging radio receiver for use in a staff location system for emitting an alerting signal responsive to a predetermined transmitted pulse calling signal having not greater than a selected calling pulse duration comprising: first circuit means including a first monostable circuit selectively responsive to the predetermined calling signal and operable to produce a first pulse in response to the predetermined calling signal, the first pulse having a duration slightly greater than said selected calling pulse duration causing the trailing edge of said first pulse to occur after termination of the calling signal; second circuit means including a differentiating circuit connected to the first circuit means and operative in response to the trailing edge of said first pulse to produce a short second pulse; third circuit means including a second monostable circuit connected to the second circuit means and operative in response to said second pulse to produce a third pulse after termination of said first pulse, said third circuit means including a timing network to automatically determine the duration of said third pulse; a local oscillator connected to the third circuit means which is set into oscillation for the duration of said third pulse; and alerting signal-producing means connected to the local oscillator and constructed to generate an alerting signal for the duration of said third pulse.

* * * * *